United States Patent
Schumacher

(10) Patent No.: US 7,257,692 B2
(45) Date of Patent: Aug. 14, 2007

(54) APPARATUS AND METHOD FOR DETECTING MEMORY LEAKS

(75) Inventor: Michael K. Schumacher, Orchard Lake, MI (US)

(73) Assignee: Lakeside Software, Inc., Keego Harbor, MI (US)

( * ) Notice: Subject to any disclaimer, the term of this patent is extended or adjusted under 35 U.S.C. 154(b) by 364 days.

(21) Appl. No.: 10/676,766

(22) Filed: Oct. 1, 2003

(65) Prior Publication Data
US 2005/0076184 A1  Apr. 7, 2005

(51) Int. Cl.
*G06F 12/00* (2006.01)

(52) U.S. Cl. ...................................................... 711/170

(58) Field of Classification Search ................ 711/170, 711/100; 717/124, 154
See application file for complete search history.

(56) References Cited

U.S. PATENT DOCUMENTS

| | | | |
|---|---|---|---|
| 6,523,141 B1 * | 2/2003 | Cantrill ...................... | 711/170 |
| 6,658,652 B1 * | 12/2003 | Alexander et al. .......... | 711/100 |
| 2004/0078540 A1 * | 4/2004 | Cime et al. .................. | 711/170 |
| 2005/0081190 A1 * | 4/2005 | Betancourt et al. ......... | 711/159 |

OTHER PUBLICATIONS

"Run-Time Library Reference", Microsoft Corp., http://msdn2.microsoft.com/en-us/library(d=robot)/d41t22sb.aspx, Windows Operating System, v. 1998-2003.*

Web page http://msdn.microsoft.com/library/en-us/vsdebut/html/vxconenablingmemoryleakdectection . . . dated Jun. 2, 2003 regarding "Enabling Memory Leak Detection (Visual Studio Debugging)".

Web page http://www.compuware.com/products/devpartnes/bound.htm dated Jun. 2, 2004 regarding "Compuware BoundsChecker (for DevPartner)".

Web page http://www.parasoft.com/jsp/products/home.jsp?product=Insure&itemId=82 dated Jun. 2, 2004 regarding "Insure++ Automatic Runtime Error Detection".

* cited by examiner

*Primary Examiner*—Pierre-Michel Bataille
(74) *Attorney, Agent, or Firm*—Dykema Gossett PLLC

(57) ABSTRACT

A system and method for detecting memory leaks includes a monitoring agent, a user interface for configuring operating parameters and a reporting mechanism. The monitoring agent determines allocated memory levels of a monitored application at a sampling frequency and determines when a then-existing "peak" memory level has increased. The monitored application is determined to be leaking memory when a determined number of increases in the peak allocated memory level are detected. The determined number may be fixed ahead of time or may be calculated dynamically based on user specified parameters. When a given memory leakage rate is exceeded, an alarm response is taken, which may be either a specified notification of the alarm or an action. Certain increases in the peak allocated memory levels are ignored as not necessarily being indicative of a memory leak condition, such as during startup of the program or between rapidly, closely-occurring increases in the peak allocated memory level.

30 Claims, 2 Drawing Sheets

APPARATUS AND METHOD FOR DETECTING MEMORY LEAKS

BACKGROUND

1. Technical Field

The invention relates generally to computing systems, and more particularly to a system and method for detecting memory leaks in applications running on monitored computer systems.

2. Description of the Related Art

A memory "leak" occurs when an application allocates a block of memory (either directly or indirectly through the use of various programming interfaces), and then fails to deallocate the memory when it is no longer required. Memory leaks consume system resources that could otherwise be available to the operating system and other applications.

Failure to release allocated memory is a very common programming error. Due to the complexity of software applications and their memory management, such memory leaks frequently exist in software delivered to end users. Because the memory requirements of applications change dynamically over time, it can be very difficult for an end-user to detect memory leaks in software that they are using.

When memory leaks go undetected, system resources that they consume become unavailable to the operating system and other applications. This has the effect of reducing performance, and in some cases, causing unscheduled downtime for applications and the operating system.

There are many memory leak detection solutions available to application developers. Such conventional solutions, however, require that the application be instrumented for memory leak detection through source code modifications, the use of an application debugger, or through libraries linked to applications. While these known solutions can be fairly precise in identifying memory leaks and can often pinpoint the source code where the leaked memory was allocated, they have the shortcoming that they require access to or modifications of the application in order to perform the memory leak detection. Such known solutions therefore do not solve the problem faced by typical end users that do not have access to the application source code. Additionally, end users wish to monitor applications in their normal mode of operation not in a special "debug" mode.

There are also known solutions available that can report when a system's resources have been consumed to the point that performance is suffering. These known solutions, however, are unable to determine which application is leaking. Additionally, they often report the problem when it has reached a crisis level. Finally, they may be unable to detect small memory leaks at all.

There is therefore a need for a method and system for detecting memory leaks that minimizes and/or eliminates one or more of the shortcomings set forth above.

SUMMARY OF THE INVENTION

One object of the invention is to provide a solution to one or more of the shortcomings set forth in the Background. The present invention has several advantages. One advantage of the present invention is that it does not require access to and modification of the source code of the monitored application. Another advantage is that it does not have to be instrumented, does not require an application debugger nor does it require linkage to a special set of library routines. Another advantage is that it is operative to detect memory leaks while the monitored application runs in a normal mode, not a special debug mode. Finally, the present invention provides detection of memory leaks long before a crisis level of resource depletion has occurred.

These and other objects, features and advantages of the present invention may be achieved through a method and apparatus for detecting memory leaks for an application program executing on a computer. The method, in one embodiment, includes the step of determining when a peak allocated memory level has increased a determined number of times during a determined time interval. In a preferred embodiment, the method includes the further step of filtering out increases in peak allocated memory levels that are not indicative of a memory leak associated with the application program. The filtering step may include the substep of ignoring increases in peak allocated memory levels during a startup time interval immediately after the monitored application program begins to execute. The filtering step may further include the substep of ignoring increases in peak allocated memory levels that occur after the startup time interval but that occur less than a preselected time apart, which are not necessarily indicative of a memory leak and may be indicative of normal memory allocation activity.

An apparatus for detecting memory leaks is also presented.

DETAILED DESCRIPTION OF THE PREFERRED EMBODIMENTS

Figure 1:
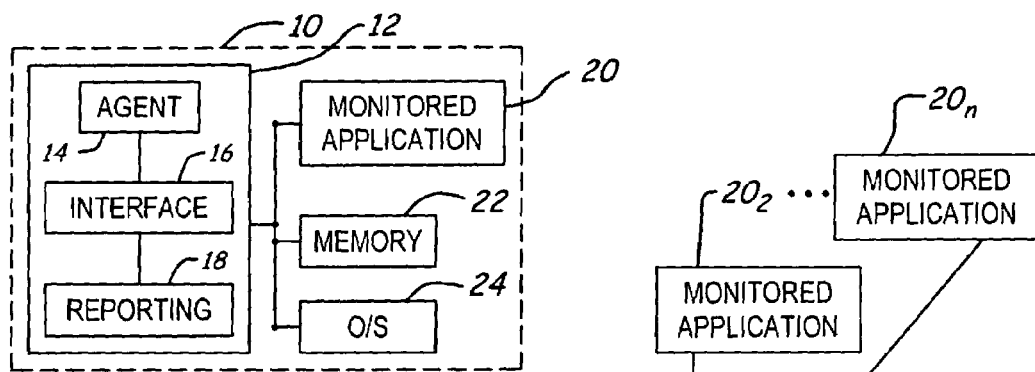
FIG. 1 shows a computer having a memory leak detection and reporting system according to the invention.

Referring now to the drawings wherein like reference numerals are used to identify identical components in the various views, FIG. 1 shows a computer 10 having a memory leak detection and reporting system 12 according to the invention. The system 12 includes (i) a monitoring agent ("agent") 14 for monitoring peak allocated memory levels at a predetermined sampling frequency; (ii) a user interface 16 for configuring operating parameters of system 12; and (iii) a reporting mechanism 18 for logging events, generating notifications and/or taking prescribed actions. FIG. 1 shows a stand-alone embodiment wherein system 12 executes on the same computer 10 as a monitored application 20. Monitored application 20 has an associated allocated memory level in a memory 22. It should be understood that the monitored application may employ or use memory from one or more memory pools (if supported by the operating system), and the present invention is configured to be compatible with such an arrangement. In one embodiment, agent 12 is provided as application program, but could alternately be incorporated in an operating system, such as O/S 24, of computer 10 or alternatively implemented using hardware components.

Figure 2:
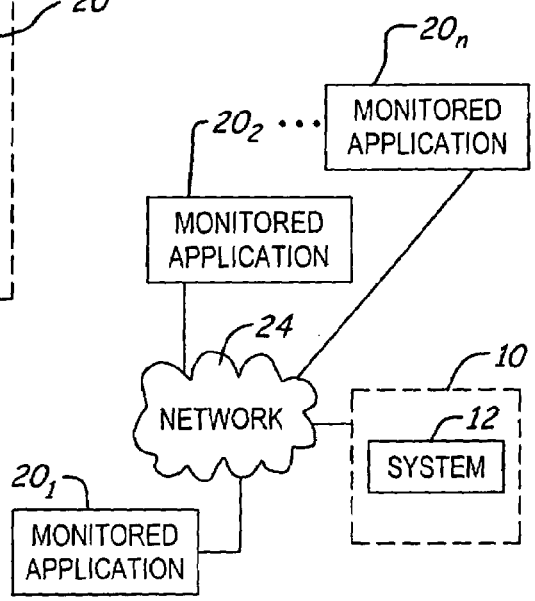
FIG. 2 shows an alternate, distributed computing embodiment of the present invention operating over a network.

FIG. 2 shows an alternate, distributed computing embodiment of the present invention operating over a network. For example, where computer 10 is a first computer, FIG. 2 shows system 12 on the first computer 10 configured to detect a memory leak on one or more of the monitored applications $20_1$, $20_2$, ... $20_n$ executing on other computers. The first and second (other) computers are in communication with each other over a network 24. In this alternate embodiment, agent 14 of system 12 collects data on the monitored application 20 over network 24. Data concerning the monitored applications may be stored in a local database (not shown) available to system 12. Network 24 may comprise any kind of communication network now known or hereafter developed, including without limitation a local area network, a wide area network, the Internet, or network. Monitored applications $20_1$, $20_2$, ... $20_n$ may be server applications, for example, with computer 10 being a separate system/display where reporting may be made.

In addition, computer 10 may comprise any conventional computing apparatus, and, in one embodiment, may comprise a Windows-based computer. It should be understood, however, that the present invention is not so limited. Computer 10 may be based on other widely available operating systems 24, such as, but not limited to, Unix-based systems, Linux-based systems, and Apple Macintosh-based systems.

Before proceeding to a detailed description of the system and method of the present invention, an brief description will be set forth of several characteristics of memory allocation generally, and the memory leak mechanism specifically, that Applicant has discovered. The purpose of this section will become apparent as this detailed description proceeds.

Figure 3:
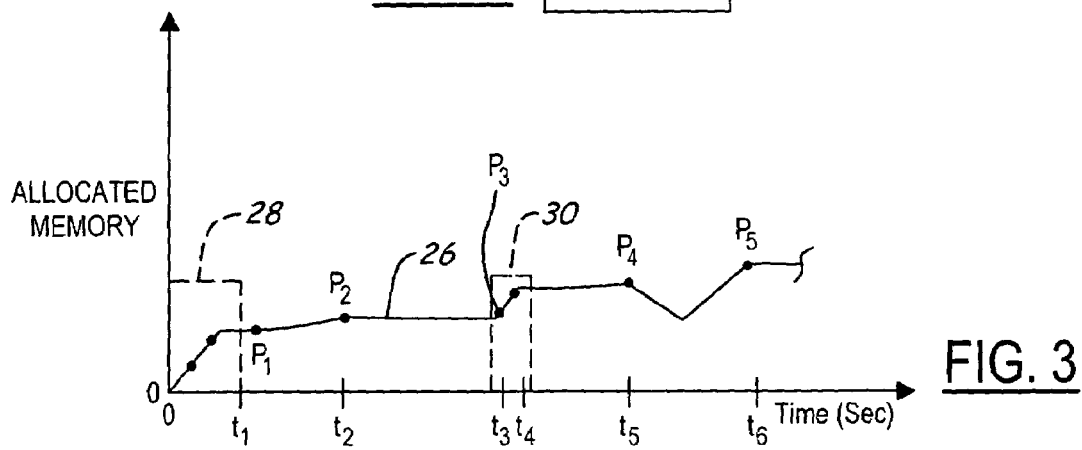
FIG. 3 is a simplified timing diagram showing an exemplary allocated memory versus time graph.

FIG. 3 is a simplified timing diagram showing an exemplary allocated memory versus time graph. The level of the allocated memory is shown by trace 26 and is shown on a per application basis. Note at time zero, immediately prior to the beginning execution of the monitored application 20, the allocated memory is zero.

In general, the present invention monitors the allocated memory levels at a predetermined frequency, and determines peak allocated memory levels. The invention is further configured to determine increases in the peak allocated memory levels. The present invention determines that a memory leak exists when it has counted a predetermined number of increases in the peak allocated memory level. The predetermined number of times is herein sometimes referred to as an Alarm Limit. The predetermined number of times may, in one embodiment, comprise a determined number of times, being either (1) fixed in advance of the operation of the inventive program (e.g., user selected), or (2) dynamically set by the system during operation based on criteria. Exemplary peaks that represent an increase over the prior "peak" level indicative of memory leaks are designated $P_1$, $P_2$, $P_3$, and $P_4$ in FIG. 3. Note that some increases in peak allocated memory levels do not carry the $P_i$ designation. These will be explained in turn.

First, there is the startup period. The time interval from time zero to the time designated $t_1$ is herein referred to as a startup time interval 28. This is shown in FIG. 3 enclosed in a dashed-line box. Applications frequently allocate memory that is used only for initialization during their startup period. Such memory usage often creates peaks that are not indicative of a memory leak. Employing the invention during startup might also set a "high" peak that would obscure later peaks that occur as an application really leaks memory. In accordance with the present invention, increases in peak allocated memory levels are filtered out or ignored during startup period 28 as not being indicative of a memory leak. These do not count toward the predetermined number of times (Alarm Limit) required to conclude that there is a memory leak in the monitored application 20.

Second, there are normal "burst" increases in allocated memory. The present invention uses a time delay between successive "peaks" to filter out (ignore) certain increases in the peak allocated memory level. When two increases occur too close together the latter increase is ignored and is not counted toward the Alarm Limit. The time delay is used to avoid bursts of memory allocation activity that may occur in normal processing from rapidly counting toward the Alarm Limit, thereby triggering, perhaps falsely, the presence of a memory leak. While such rapid increases may be ambiguous as to whether there is in actuality a memory leak or not, real memory leaks that are significant tend to occur many times over a long period of time. Thus, ignoring closely spaced increases removes the ambiguity and improves the reliability of the detection. Filtering out increases in peak allocated memory of this type help minimize or eliminate false alarms. For example, the successive increase in peak allocated memory occurring at time point $t_4$ is not necessarily indicative of a memory leak and may simply reflect normal processing (i.e., it occurs too closely in time to the prior peak at time $t_3$). This increase in peak allocated memory is therefore filtered out (ignored) in counting towards the Alarm Limit. This peak at $t_4$, along with the peak at $t_3$, are enclosed in dashed-line box designated 30.

Figure 4:
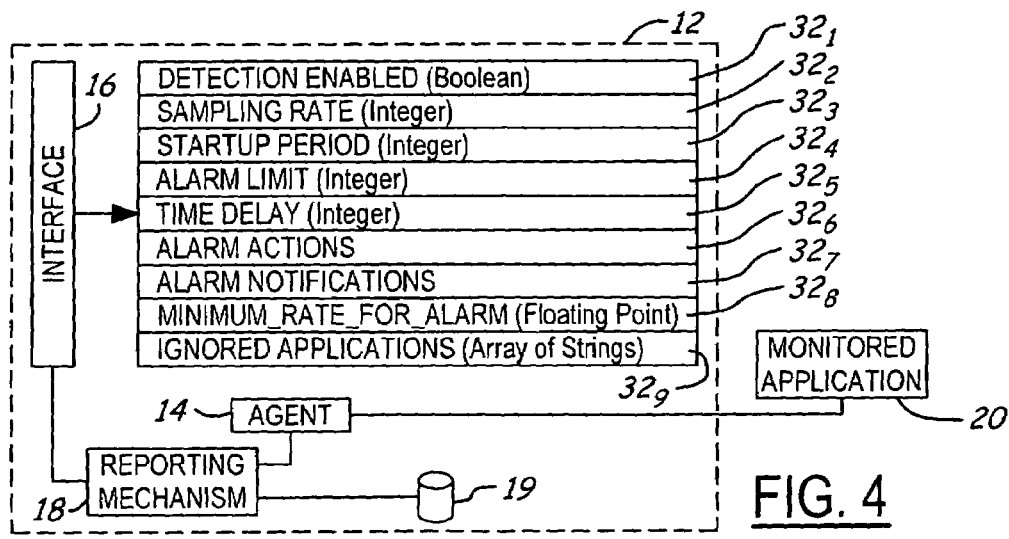
FIG. 4 is a simplified block diagram showing, in greater detail, the system of FIG. 1 and FIG. 2.

FIG. 4 is a simplified block diagram showing, in greater detail, system 12 of FIG. 1 and FIG. 2. FIG. 4 shows monitoring agent 14, interface 16, reporting mechanism 18, and a plurality of operating parameters $32_1$ through $32_9$. Interface 16 is configured so as to allow a user of the inventive system 12 to specify a particular value or contents for at least one of, and preferably all, of the operating parameters $32_1$ through $32_9$. These operating parameters control the operation of the inventive method, and whose values or contents may be stored locally in a file, although such values could be stored, in alternative embodiments, in database or even hard-coded. In one embodiment, one set of values for the operating parameters is used. It should be understood, however, that in alternative embodiments, different sets of values for the operating parameters may be defined for different, respective monitored environments.

In one embodiment, the operating parameters include:

1. DETECTION_ENABLED (type Boolean). This parameter is used to globally enable and disable the operation of the memory leak detection system.

2. SAMPLING_RATE (type integer). This parameter controls the frequency at which the memory usage of monitored applications is sampled.

3. STARTUP_PERIOD (type integer). This parameter specifies the time, in seconds, that is considered part of startup period for monitored applications.

4. ALARM_LIMIT (type integer). This parameter specifies the number of increases in the peak allocated memory size that must occur before an application is flagged as leaking memory.

5. TIME_DELAY (type integer). This parameter specifies the minimum time, in seconds, between increases in peak allocated memory size that count toward the application reaching ALARM_LIMIT.

6. ALARM_ACTIONS. This parameter specifies what actions, if any should be taken when a memory leak alarm is triggered.

7. ALARM_NOTIFICATIONS. This parameter specifies what notification mechanisms should be used to inform the user when a memory leak alarm is triggered.
8. MINIMUM_RATE_FOR_ALARM (type floating point). This parameter specifies the minimum leakage rate, in kilobytes per minute, that triggers an alarm.
9. IGNORED_APPLICATIONS (type array of strings). This parameter specifies a list of application on which memory leak detection is not performed.

In one embodiment, default values may be as follows: Sampling Rate (5 seconds); Startup Period (180 seconds); Alarm Limit (45 times); Time Delay (75 seconds); and the Minimum Rate For Alarm (200 bytes/minute). Of course, as indicated, these default values may be changed by a user by way of the interface 16.

FIG. 4 also shows a reporting mechanism 18. In one embodiment, the reporting mechanism may include an alarm database 19 for allowing an alarm interface to record an alarm/response for later retrieval/review, a log file, an interface to the system event log, an e-mail interface for specifying one or more (i.e., a list) of e-mail addresses to which notifications are made, an Simple Network Monitoring Protocol (SNMP) interface, as well as other notification mechanisms. Reporting mechanism 18 is configured to allow selection of zero or more notifications from the group, to be performed upon detection of memory leak in excess of the minimum rate for alarm, comprising an e-mail message, a simple network monitoring protocol (SNMP) message, a telecommunications page, a visual notification on a display associated with a computer, an audio notification, and a combination of any of the foregoing notifications.

The reporting mechanism 18 is also configured to allow the user to select an action (to be performed when a memory leak exceeds the minimum rate for alarm) from the group comprising no action, running a program or script, killing the program, rebooting the computer on which the program is executing and a combination of any of the foregoing actions. Of course, other responses, either in the nature of a notification or an action, may be included and remain within the spirit and scope of the present invention.

Figure 5:
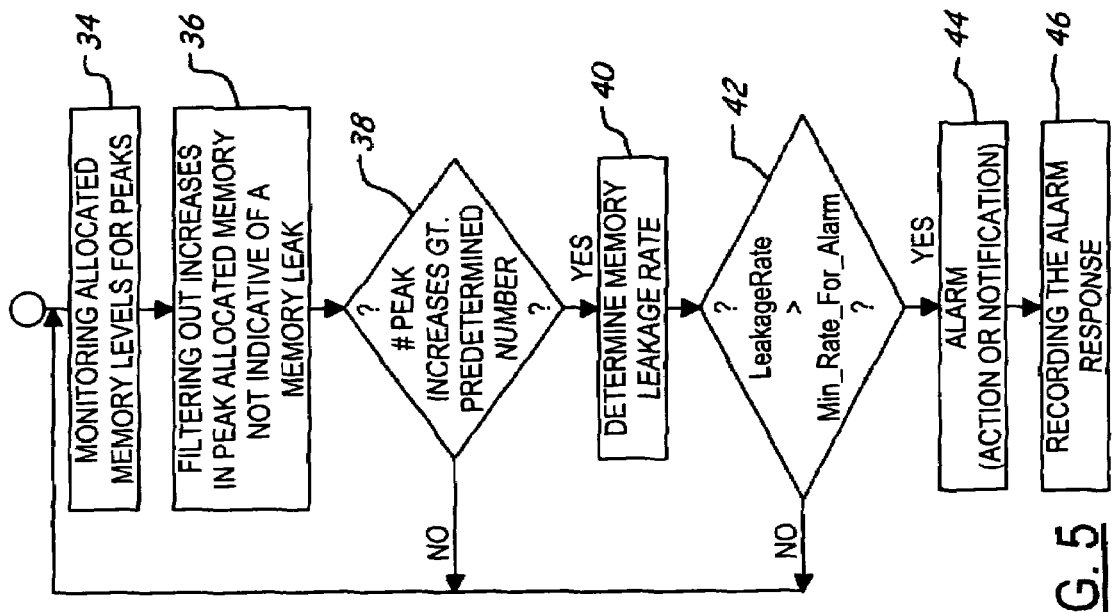
FIG. 5 is a simplified flow chart showing the operation of a method in accordance with the present invention.

FIG. 5 is a simplified flow chart showing the operation of a method in accordance with the present invention. The method begins with step 34.

In step 34, the execution of the present invention begins. In one embodiment, a mechanism is provided that detects the start of new applications. Such mechanisms are known for performing this function. The remainder of the description is performed independently on each application that is monitored for memory leaks by system 12. When a new application is started, it is added to a list (not illustrated) of tracked applications. Tracked applications are removed from this list upon termination.

In step 34, generally, agent 14 monitors a tracked or monitored application to determine allocated memory usage. Step 34 may include the substeps of sampling the memory level at the frequency determined by SAMPLING_RATE operating parameter $32_2$ for each monitored application for which a memory leak has not already been detected. This step may involve use of programming interfaces to determine the current total allocated memory for the monitored application. The determined memory level is recorded (unless it occurs during the startup period, which is explained in greater detail below in connection with the filtering step 36). To the extent that a new "peak" has not been reached, the method may, in an alternate embodiment, proceed to the next monitored application on the list. However, if a new "peak" is determined to have been achieved, then the time of the new peak allocated memory is also recorded for later use. It should be understood that other embodiments could use other mechanisms to determine if an application should or should not be monitored for memory leaks. In addition, it should be further understood that other mechanisms could be used to determine the sampling times, including event-based mechanisms triggered by application memory allocation requests. The method proceeds to step 36.

In step 36, the method is configured for filtering out increases in peak allocated memory levels that are not necessarily indicative of a memory leak. This step may be performed by one or more substeps. For example, step 36 may involve the substep of ignoring increases in peak allocated memory levels during a startup time interval immediately after the monitored program begins to execute. Step 36 may also involve the substep of ignoring increases in peak allocated memory levels that occur after the startup time interval but that occur less than a preselected time apart which are not necessarily indicative of a memory leak and may simply be indicative of a normal burst of memory allocation activities. As to the step of ignoring startup activity, this may be implemented by determining how long the application has been running, and if it is still in startup as defined by the STARTUP_PERIOD operating parameter $32_3$, ignore sampled memory levels and move on to the next monitored application in the list. As to the step of ignoring "burst activity", this step may be implemented by determining how long it has been since a peak memory increase has been counted toward the ALARM_LIMIT operating parameter $32_4$, and, if it has been less than the TIME_DELAY operating parameter $32_5$, then ignore the sampled memory levels and move on to the next monitored application. The method then proceeds to step 38.

In step 38, the method determines whether the number of increases in the peak allocated memory has reached a predetermined number of times (i.e., the Alarm Limit). If the answer is NO, then the method branches to the next monitored application on the list, or, in the case of the monitored application the subject of the flow chart in FIG. 4, back up to step 34. If the answer is YES, the method branches to step 40.

In step 40, the method calculates an estimated memory leakage rate. The method may perform this step by determining the difference (e.g., in kilobytes) between the current peak memory level and the initial peak memory level increase after the startup period or the second increase since time zero. Note, the first sampled memory level after the startup period will indicate an "increase" over the initial allocated memory when the program began (which would be zero). This may be considered the first peak increase. What is being referred to here as the initial increase after startup is the next increase in the peak level or the second increase in the peak level. In any event, the difference (e.g., in minutes) is also determined between the current peak memory level and the second peak memory level (as defined above). Dividing the difference in the memory level by the difference in time will yield a memory leakage rate. Of course, alternative mathematical approaches for calculating a memory leakage rate may be used and remain within the spirit and scope of the present invention. The method proceeds to step 42.

In step 42, the method compares and determines whether the calculated memory leakage rate exceeds the minimum rate for alarm operating parameter $32_8$. If the answer is NO, then the method branches to the next monitored application on the list, or, in the case of the monitored application at hand, back up to step 34. If the answer is YES, and, optionally, the monitored application is not in the IGNORED_APPLICATIONS list (operating parameter 32₉ set forth above) then the method branches to step 44.

In step 44, the method produces a response in the form of either a notification or an action, as described in detail above with respect to reporting mechanism 18. The method proceeds to step 46.

In step 46, the method records the response (notification, action or both) for later review.

Figure 6:
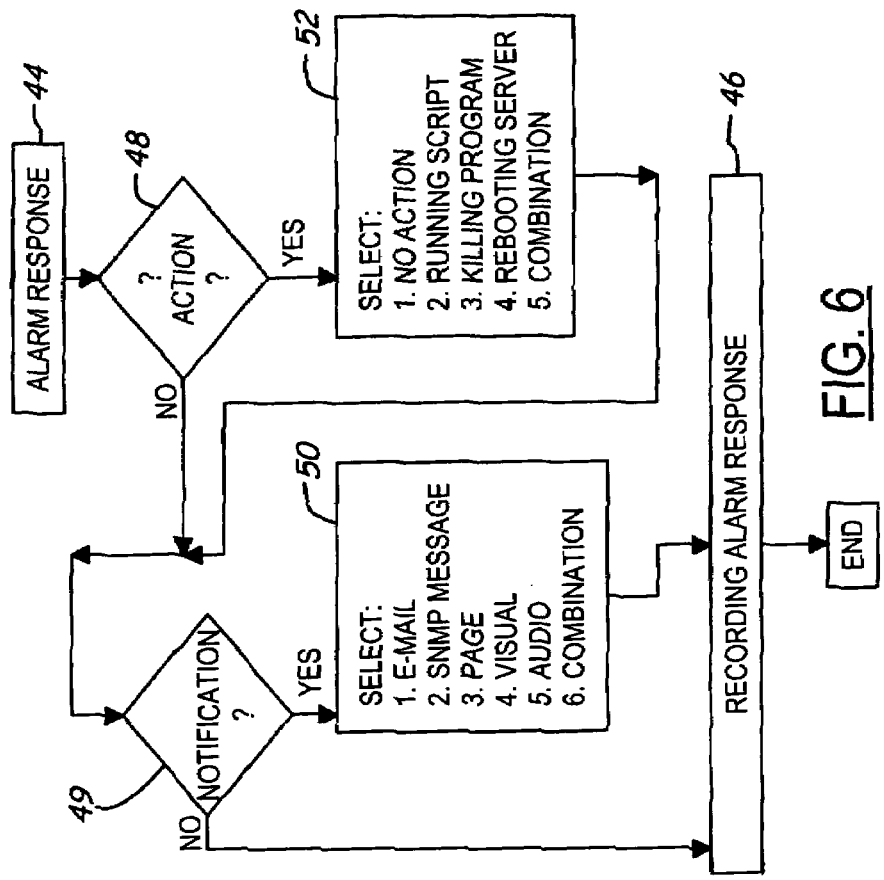
FIG. 6 is a simplified flowchart showing, in greater detail, the alarm response step in FIG. 5.

FIG. 6 is a simplified flowchart showing, in greater detail, the alarm response step 44 in FIG. 5. This detailed flowchart starts with step 44, which assumes a response (action or notification) has been specified by the user, and then proceeds to a decision step 48.

In step 48, the method determines whether the specified response(s) is an action. If the answer to decision block 48 is YES, then the method branches to step 52. In step 52, the method selects one or more of the specified actions and executes them. These actions may include "no action", running a program or script for performing additional functions, killing (terminating) the application program with the memory leak, rebooting the computer (e.g., rebooting a server if the computer 10 is a configured as a server), or any combination of the above. The method then proceeds to step 49.

Step 49 also accepts the flow of control when the answer in the decision block 48 is "NO." In step 49, the method determines whether the specified response(s) include a notification. If "YES," then the method branches to step 50.

In step 50, the method selects one or more of the specified notifications and executes them. These may include sending a notification as to the alarm in the form of an e-message to one or more e-mail addresses specified in a list, an SNMP message, a telecommunications page, a visual or audio message, or any combination of the above.

Upon completion of step 50, the method branches to step 46, described above.

If the answer to decision block 49 is "NO," then the method branches to an "end" block of this subpart of the method shown in FIG. 6.

It should be understood that the functions and methodologies may be performed through appropriate programming of computer 10 using conventional programming tools known to those of ordinary skill in the art. Accordingly, the computer 10 configured by way of programming constitute the structure corresponding to the recited functions in the apparatus claims. Other structures, however, are contemplated including without limitation electronic hardware, including computer hardware suitably configured to perform the functions recited in the claims.

In support thereof of the foregoing, pseudocode for implementing an exemplary embodiment is hereby reproduced below.

at SAMPLING_RATE frequency:
    for each "app" that is active:

```
// Ignore the process if we have an active memory leak alarm or if the
// process is still in its startup period
if (   (DETECTION_ENABLED)
    && (!MemLeakAlarmIsActive)
    && (TimeLoaded(app) > STARTUP_PERIOD))
{
    // Has the VM size increased?
    if (CurrentPeakMemoryUsage > RecordedPeakMemoryUsage)
```

-continued

```
    {
        RecordedPeakMemoryUsage = CurrentPeakMemoryUsage;
        // Has the inter-increase delay period expired since the last
        // peak VM increase that we measured?
        if ((GetCurrentTime( ) - LastIncTime) > TIME_DELAY)
        {
            // Count this peak VM size increase
            LastIncTime = GetCurrentTime( );
            NumVmIncreases++;
            // Record usage a second increment so that we can later
            // estimate a rate
            if (NumVmIncreases == 2)
            {
                UsageAtSecondIncTime = CurrentPeakMemoryUsage;
                SecondIncTime        = LastIncTime;
            }
            // If we have reached the configured limit, signal an
alarm.
            if (NumVmIncreases >= ALARM_LIMIT)
            {
                // Estimate the leakage rate in kilobytes per minute
                double leakageRate = ((CurrentPeakMemoryUsage -
UsageAtSecondIncTime)
                                       / 1000.0)
                                     / ((LastIncTime - SecondIncTime)
                                       / 60.0);
                // Ignore leaks that are smaller than the configured
                // alarming threshold
                if (leakageRate > MINIMUM_RATE_FOR_ALARM)
                {
                    // Make sure that this app is not in the "ignore"
                    // list for memory leaks
                    if (!AppIsIgnored (app))
                    {
                        // call the alarm class to start a new alarm,
                        // record it in the database, take actions and
                        // perform notifications
                        StartAlarm ( )
                        MemLeakAlarmIsActive = true
                    }
                }
            }
        }
    }
}
```

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

The invention claimed is:

1. A method of detecting memory leaks for a program executing on a computer, said method comprising the step of determining when a peak allocated memory level has increased a determined number of times wherein said determined number of times defines an alarm limit, said determining step including the substeps of:

sampling allocated memory levels for the program for which a memory leak has not been detected;

identifying increases in the peaks of the sampled allocated memory levels that are countable towards the alarm limit based on whether the increases in peak allocated memory levels are indicative of a memory leak associated with said program;

detecting a memory leak when countable increases in peak allocated memory levels reach the alarm limit.

2. The method of claim 1 further including the steps of:

defining a startup time interval that begins with the initial execution of the program on the computer and which has a determined duration;

ignoring increases in peak allocated memory levels that occur during the startup time interval such that any increases in peak allocated memory levels that occur during the startup time interval are not countable towards the alarm limit.

3. The method of claim 2 further including the steps of:

establishing a determined time corresponding to a minimum time between a first increase and a second, subsequent increase in peak allocated memory levels in order for the second increase in peak allocated memory level to count towards the alarm limit;

after the startup time interval, ignoring as not countable toward the alarm limit the second increase in peak allocated memory levels when the second increase occurs less than the determined time after the first increase, which may be indicative of normal memory allocation activity.

4. The method of claim 1 further including the steps of:

establishing a determined time corresponding to a minimum time between a first increase and a second, subsequent increase in peak allocated memory levels in order for the second increase in peak allocated memory level to count towards the alarm limit;

ignoring as not countable toward the alarm limit the second increase in peak allocated memory levels when the second increase occurs less than the determined time after the first increase, which may be indicative of normal memory allocation activity.

5. The method of claim 1 further including the step of:

determining a memory leakage rate as a function of time when the countable increases in the peak allocated memory levels that occur during a determined time interval reach the alarm limit.

6. The method of claim 5 further including the step of:

producing a response when the leakage rate exceeds a determined level.

7. The method of claim 6 further including the step of:

selecting the response from one of an action and a notification.

8. The method of claim 7 wherein the selected response is an action, said method further comprising the step of:

selecting the action from the group comprising no action, running a program or script, killing the program, rebooting the computer on which the program is executing and a combination of any of the foregoing actions.

9. The method of claim 7 wherein the selected response is a notification, said method further comprising the step of:

selecting the notification from the group comprising an e-mail message, a simple network monitoring protocol (SNMP) message, a telecommunications page, a visual notification on a management console or on the computer on which the program is executing, an audio notification on a management console or on the computer on which the program is executing, and a combination of any of the foregoing notifications.

10. The method of claim 6 further including the step of:

recording the response.

11. The method of claim 5 further including the step of:

generating an alarm signal when the leakage rate exceeds a determined level.

12. A method of detecting memory leaks for a monitored application program stored in a memory of and executing on a computer, said method comprising the steps of:

(A) monitoring allocated memory levels at predetermined sampling times for the application program and for which a memory leak has not been detected;

(B) identifying increases in the peaks of the monitored allocated memory levels that are countable towards the alarm limit based on whether the increases in peak allocated memory levels are indicative of a memory leak associated with said program;

(C) determining a memory leakage rate as a function of time when countable increases in peak allocated memory levels that occur during a determined time interval reach the alarm limit;

(D) producing an alarm response when the determined leakage rate exceeds a determined level.

13. The method of claim 12 wherein said steps (A) through (D) are performed sequentially.

14. The method of claim 12 wherein said program is a first program, said method being performed by a second program executing on the computer on which the first program is executing.

15. The method of claim 14 wherein said computer is a first computer, said second program is executed in part on a second computer different from said first computer.

16. The method of claim 15 wherein said first and second computers are coupled to each other by a network.

17. The method of claim 14 further including the steps of:

selecting at least one operating parameter from the group including said determined number of times of peak allocated memory level increases, said determined time interval, said preselected level of said memory leakage rate, a sampling rate at which said monitoring step is performed, a startup time interval in which increases in peak allocated memory levels are filtered out, a time delay between increases in the peak allocated memory levels for which such increases are ignored as to said determined number of times the peak allocated memory level has increased, and said response; and providing an interface for said second computer program that allows a user to specify a value for said at least one operating parameter.

18. The method of claim 17 wherein said providing step includes the substep of:

configuring said interface so as to allow a user to specify a plurality of values for a corresponding plurality of said operating parameters.

19. The method of claim 15 further including the steps of:

selecting at least one operating parameter from the group including said determined number of times of peak allocated memory level increases, said determined time interval, said preselected level of said memory leakage rate, a sampling rate at which said monitoring step is performed, a startup time interval in which increases in peak allocated memory levels are filtered out, a time delay between increases in the peak allocated memory levels for which such increases are ignored as to said determined number of times the peak allocated memory level has increased, and said response; and providing an interface for said second computer program that allows a user to specify a value for said at least one operating parameter.

20. The method of claim 19 wherein said providing step includes the substep of:

configuring said interface so as to allow a user to specify a plurality of values for a corresponding plurality of said operating parameters.

21. An apparatus for detecting memory leaks for an application program executing on a computer, said apparatus comprising:

means for monitoring allocated memory levels at predetermined sampling times for the application program and for which a memory leak has not been detected;

means for identifying increases in the peaks of the monitored allocated memory levels that are countable towards the alarm limit based on whether the increases in peak allocated memory levels are indicative of a memory leak associated with said program;

means for producing a response when countable increases in peak allocated memory levels that occur during the determined time interval reach the alarm limit.

22. The apparatus of claim 21 further including:

means for defining a startup time interval that begins with the initial execution of said application program on the computer and which has a preselected duration;

means for ignoring increases in peak allocated memory levels that occur during said startup time interval such that any increase in peak allocated memory levels that occur during the startup time interval are not countable towards said alarm limit.

23. The apparatus of claim 21 further including:

means for establishing a preselected time corresponding to a minimum time between a first increase and a second, subsequent increases in peak allocated memory levels in order for said second increase in peak allocated memory to count towards said alarm limit;

means for ignoring as not countable towards said alarm limit the second increase in peak allocated memory levels when said second increase occurs less than the preselected time after said first increase, which may be indicative of normal memory allocation activity.

24. The apparatus of claim 21 further including means for determining a memory leakage rate as a function of time when the countable increases in peak allocated memory levels that occur during the determined time interval reach the alarm limit.

25. The apparatus of claim 24 further including means for producing a response when the leakage rate exceeds a preselected level.

26. The apparatus of claim 25 further including means for selecting the response from a plurality of actions, a plurality of notifications or a combination of said pluralities of both actions and notifications.

27. The apparatus of claim 26 wherein the selected response is an action, said apparatus further comprises means for selecting the action from the group comprising no action, running a program or script, killing the program, rebooting the computer on which the program is executing and a combination of any of the foregoing actions.

28. The apparatus of claim 26 wherein the selected response is a notification, said apparatus further comprises means for selecting the notification from the group comprising an e-mail message, a simple network monitoring program (SNMP) message, a telecommunications page, a visual notification on a display associated with the computer on which the program is executing, an audio notification originating with the computer on which the program is executing, and a combination of any of the foregoing notifications.

29. The apparatus of claim 25 further including means for recording the response.

30. The apparatus of claim 24 further including means generating an alarm signal when the leakage rate exceeds a preselected level.

* * * * *